United States Patent [19]

Hubbard et al.

[11] Patent Number: 6,013,128
[45] Date of Patent: Jan. 11, 2000

[54] VAPOR BARRIER COATING FOR POLYMERIC ARTICLES

[75] Inventors: Michael A. Hubbard, Somerset; James A. McCaulley, Clinton, both of N.J.; Steven F. Nielsen, Charlotte, N.C.

[73] Assignee: Hoechst Trespaphan GmbH, Germany

[21] Appl. No.: 09/271,218

[22] Filed: Mar. 17, 1999

Related U.S. Application Data

[60] Division of application No. 08/870,573, Jun. 6, 1997, Pat. No. 5,925,428, which is a continuation-in-part of application No. 08/662,395, Jun. 12, 1996, abandoned.

[51] Int. Cl.[7] ............................................. C09D 5/18
[52] U.S. Cl. ................................. 106/600; 106/632
[58] Field of Search ................................. 106/600, 632

[56] References Cited

U.S. PATENT DOCUMENTS

| | | | |
|---|---|---|---|
| 1,949,914 | 1/1934 | Larson | 87/27 |
| 2,998,328 | 8/1961 | Munger et al. | 117/70 |
| 3,102,038 | 8/1963 | Fisher, Jr. | 106/84 |
| 3,130,061 | 4/1964 | McMahon et al. | 106/84 |
| 3,180,747 | 4/1965 | Patton et al. | 106/74 |
| 3,282,729 | 11/1966 | Richardson et al. | 117/138.8 |
| 3,470,013 | 9/1969 | Wagner | 117/70 |
| 3,476,582 | 11/1969 | Imoto | 117/62.2 |
| 3,492,137 | 1/1970 | Iler | 106/74 |
| 3,522,066 | 7/1970 | Forsyth | 106/84 |
| 3,533,816 | 10/1970 | Oken | 106/74 |
| 3,549,395 | 12/1970 | Sears et al. | 106/84 |
| 3,706,603 | 12/1972 | Vessey et al. | 148/6.2 |
| 3,884,863 | 5/1975 | Beers | 260/29.6 |
| 4,036,721 | 7/1977 | Kato | 204/181 |
| 4,101,050 | 7/1978 | Buckler et al. | 229/3.5 |
| 4,178,273 | 12/1979 | Brown | 260/29.4 |
| 4,247,576 | 1/1981 | Kutner | 427/40 |
| 4,269,628 | 5/1981 | Ballard et al. | 106/86 |
| 4,360,611 | 11/1982 | Wakimoto et al. | 523/216 |
| 4,395,546 | 7/1983 | Jackson et al. | 106/75 |
| 4,466,831 | 8/1984 | Murphey | 106/74 |
| 4,466,832 | 8/1984 | Yoshimura | 106/74 |
| 4,472,538 | 9/1984 | Kamigaito et al. | 523/202 |
| 4,501,843 | 2/1985 | Needham | 524/445 |
| 4,503,158 | 3/1985 | Richard | 501/27 |
| 4,514,456 | 4/1985 | Deal | 428/204 |
| 4,537,866 | 8/1985 | Gilson | 502/70 |
| 4,613,542 | 9/1986 | Alexander | 428/290 |
| 4,681,818 | 7/1987 | Unnam | 428/607 |
| 4,738,896 | 4/1988 | Stevens | 428/315.9 |
| 4,775,586 | 10/1988 | Bohrn et al. | 428/324 |
| 4,803,231 | 2/1989 | Seinera et al. | 523/219 |
| 4,810,734 | 3/1989 | Kawasumi et al. | 523/216 |
| 4,885,330 | 12/1989 | Brungardt et al. | 524/447 |
| 4,889,765 | 12/1989 | Wallace | 428/290 |
| 4,937,115 | 6/1990 | Leatherman | 428/36.4 |
| 4,945,074 | 7/1990 | Blount | 501/53 |
| 5,049,609 | 9/1991 | Patitsas | 524/386 |
| 5,055,137 | 10/1991 | Holcombe | 106/600 |
| 5,130,110 | 7/1992 | Rouet | 423/329 |
| 5,164,003 | 11/1992 | Bosco et al. | 106/287.1 |
| 5,183,704 | 2/1993 | Bohrn et al. | 428/305.5 |
| 5,238,668 | 8/1993 | Novotny | 423/333 |
| 5,244,729 | 9/1993 | Harrison et al. | 428/331 |
| 5,290,845 | 3/1994 | Berg | 524/443 |
| 5,330,794 | 7/1994 | Bosco | 427/387 |
| 5,344,633 | 9/1994 | Sorensson | 423/333 |
| 5,354,548 | 10/1994 | Araya | 423/700 |
| 5,384,192 | 1/1995 | Long et al. | 428/336 |
| 5,393,560 | 2/1995 | Okada | 427/150 |
| 5,462,779 | 10/1995 | Misiano | 428/34.7 |
| 5,503,820 | 4/1996 | Moffet | 423/333 |
| 5,552,469 | 9/1996 | Beall et al. | 524/445 |
| 5,560,773 | 10/1996 | Gimvang | 106/634 |
| 5,565,273 | 10/1996 | Egli | 428/426 |
| 5,575,953 | 11/1996 | Tachizono | 252/504 |
| 5,631,080 | 5/1997 | Fugitt | 428/331 |
| 5,853,830 | 12/1998 | McCaulley et al. | 428/35.7 |
| 5,882,798 | 3/1999 | Hubbard et al. | 428/446 |

FOREIGN PATENT DOCUMENTS

| | | |
|---|---|---|
| 16839 70D | 1/1972 | Australia . |
| 993738 | 7/1976 | Canada . |
| 084 266 | 7/1983 | European Pat. Off. . |
| 108 827 | 5/1984 | European Pat. Off. . |
| 311432 | 4/1989 | European Pat. Off. . |
| 518646 | 12/1992 | European Pat. Off. . |
| 518647 | 12/1992 | European Pat. Off. . |
| 67 779 | 12/1973 | Luxembourg . |
| 1007482 | 10/1965 | United Kingdom . |
| 1424425 | 2/1976 | United Kingdom . |
| 1532847 | 11/1978 | United Kingdom . |
| WO 97/44379 | 11/1997 | WIPO . |
| WO 97/47678 | 12/1997 | WIPO . |
| WO 97/47694 | 12/1997 | WIPO . |
| WO 97/47695 | 12/1997 | WIPO . |

OTHER PUBLICATIONS

H. van Olphen, "Clay Minerology", *An Intro to Clay Colloid Chemistry*, 27:69–71 (1963).

H. H. Weldes & K. R. Lange, "Properties of Soluble Silicates", *Industrial & Engineering Chemistry*, 61 (4):29–44 (Apr. 1969).

W. J. Ward et. al. "Gas Barrier Improvement Using Vermiculite & Mica In Polymer Films", *J. Membrane Science* 55: 173–180 (1991).

DuPont: "Fireproof Silicate Paints" Product Licensing Index, vol. 78, No. 8458, Havant GB, p. 177, XP002042865.

(List continued on next page.)

*Primary Examiner*—David Brunsman
*Attorney, Agent, or Firm*—Howson and Howson

[57] ABSTRACT

A vapor barrier coating solution for polymeric articles is provided which contains a selected layered silicate dispersed in a cationic aqueous metal polysilicate, wherein the weight fraction layered silicate of total inorganic solids in the dry coating ranges from above 0 to about 99.

13 Claims, No Drawings

OTHER PUBLICATIONS

N. R. Horikawa et. al., "Drying and Water Resistance of Silicate Films", *Adhesives Age*, 10 (7):30–34 (1967).

Abstract of Japanese Patent 60005057, Database WPI, Section CH, Week 8508, Derwent Publications Ltd., London, GB; AN 85–047068, XP002043002 & JP 60 005 057 A, Toyota Res. & Dev. Lab (Jan. 11, 1985).

Abstract of Japanese Patent 52 135 339, Database WPI, Section CH, Week 7751, Derwent Publications Ltd., London, GB; AN 77–91268Y, XP002043003 & JP 52 135 339 A, Nisshin Eng. Co. Ltd. (Jan. 11, 1985).

Database WPI Section CH, Week 9439, Derwent Publications Ltd., London, GB; AN 94–313903 XP002040546 & JP 06 240 174 A (Asahi Kagaku Kohyo KK) (Aug. 30, 1994).

Patent Abstracts of Japan, vol. 095, No. 004, May 31,1995 & JP 07018202A (Agency of Ind. Science & Technol.) Jan. 20, 1995.

VAPOR BARRIER COATING FOR POLYMERIC ARTICLES

CROSS-REFERENCE TO OTHER APPLICATIONS

This is a division of U.S. Ser. No. 08/870,573 filed Jun. 06, 1997, now U.S. Pat. No. 5,925,428 which is a continuation-in-part of pending U.S. patent application Ser. No. 08/662,395, filed Jun. 12, 1996 now abandoned.

FIELD OF THE INVENTION

The present invention relates generally to silicate-based barrier coatings for polymeric articles.

BACKGROUND OF THE INVENTION

The coating of thermoplastic polymer substrates with moisture resistant barrier coating compositions to provide impermeability to gases such as oxygen, and liquids, is known [See, e.g., U.S. Pat. No. 3,282,729]. Alkali metal polysilicates have long been known as protective coatings that modify the permeability or surface characteristics of polymeric films and other articles [See, e.g., U.S. Pat. Nos. 1,007,482; 1,424,425; 1,949,914; 3,102,038; 3,130,061; 3,180,747; 3,492,137; 3,522,066; 3,533,816 and 3,706,603].

Lithium (Li), potassium (K), and sodium (Na) polysilicate are used in coatings for a variety of surfaces. For example, Hecht and Iler, Canadian Patent No. 993,738, describe a gas and liquid-impermeable coating for polymeric substrates comprising lithium polysilicate having a mole ratio of $SiO_2$ to $Li_2O$ of between about 1.6 and 4.6.

Although alkali metal polysilicate barrier coatings do provide excellent vapor, gas and aroma barrier properties to coated articles, the authors have found that some metal polysilicate barrier coatings display reduced oxygen barrier performance at relative humidities greater than about 60 percent. Additionally, polymeric films coated with said alkali metal polysilicate barrier coatings exhibit reduced barrier performance when subjected to repeated flexing.

Additionally, polymeric articles are known to become hazy after certain polysilicate coatings have been incorporated. The tendency of sodium polysilicate coatings to effloresce, i.e., to become covered by powdery crystalline material as a result of atmospheric exposure, has been documented [Weldes and Lange, *Ind. Eng. Chem.*, 61(4):28–44 (1969)]. This characteristic has similarly been observed for lithium polysilicate coatings by the present inventors. In contrast, pure potassium polysilicate coatings do not effloresce, but suffer severe loss of barrier performance above 50 percent relative humidity. Pure lithium polysilicate coatings, on the other hand, exhibit little to no loss of barrier performance over the same relative humidity range.

Vermiculite, a layered silicate, has also been employed as an ingredient in coatings of various types. For example, U.S. Pat. No. 5,183,704 refers to so-called 2:1 layered silicates, where the silicates are selected from mica and vermiculite. W. J. Ward et al, *J. Membrane Science*, 55:173–180 (1991) suggests vermiculite may provide the basis for a variety of improved coatings for films. It is stated that vermiculite could be used in a sprayed-on high barrier coating for low barrier plastics. U.S. Pat. No. 5,244,729 refers to a polymeric film having a coating layer which comprises vermiculite platelets. See, also, U.S. Pat. No. 4,101,050 and European patent applications No. 92305329.2, published Dec. 16, 1992 as EP No. 518,647 and 92305330.0, published Dec. 16, 1992 as EP No. 518,646.

Although layered silicates, including vermiculite, are known to form stable aqueous suspensions, these suspensions are also known to become destabilized in the presence of dissolved metal cations, such as those present in alkali metal polysilicates. Such destabilization results in flocculation of the layered silicates and reduces their efficacy in vapor, gas and aroma barrier applications.

There remains a need in the art for barrier coatings which overcome these deficiencies in prior art coatings.

SUMMARY OF THE INVENTION

In one aspect, the present invention provides a vapor barrier coating solution for polymeric articles comprising a layered inorganic mineral filler dispersed in an inorganic binder. In a desirable embodiment, the filler is a layered silicate and the binder is an alkali metal polysilicate. The weight fraction of the layered silicate in the dried coating ranges from above 0 to about 99 percent.

In a preferred aspect, a vapor barrier coating solution for polymeric articles comprises vermiculite dispersed in a solution of aqueous lithium polysilicate, wherein the weight fraction of the layered silicate in the dried coating ranges from above 0 to about 99 percent.

In still another aspect, the invention provides a polymeric article, such as a film or bottle, coated with the coating solutions described above. The polymer may be a polyolefin, a polyester, or a polyamide, and may be biaxially oriented.

In yet another aspect, the invention provides a method of coating a polymeric article comprising the steps of (a) dispersing a layered inorganic mineral filler, e.g., a layered silicate in an inorganic binder, such as an aqueous alkali metal polysilicate suspension in an amount sufficient to create a suspension wherein the weight fraction of layered inorganic filler in the inorganic components of the dried coating from above 0 to about 99 percent, (c) coating the article using standard coating technology, d) drying the coated article, and (e) optionally laminating the barrier coated article. The coating, when dried, provides a high vapor barrier to the article.

In yet another aspect, the invention provides a method of increasing resistance of a barrier coating to loss of barrier properties due to flexing by incorporating into the barrier coating solution a layered, inorganic mineral filler with a high aspect ratio.

Other aspects and advantages of the present invention are described in the detailed description below and in the claims.

DETAILED DESCRIPTION OF THE INVENTION

The present invention overcomes the deficiencies in prior art barrier coatings by providing a coating solution containing a layered inorganic mineral filler and an inorganic binder which provide high vapor barrier capability and flex resistance. Preferably, the coating solution comprises a metal polysilicate and layered silicate, which, when dried, provides excellent barrier characteristics, especially at high relative humidity in comparison with coatings containing only metal polysilicates. The vapor barrier coating solution of the present invention may be applied to any polymeric article.

A. Definitions

The term "vapor" implies a liquid at partial pressure, such as water vapor. The term "gas" includes oxygen, nitrogen, carbon dioxide and others. "Aroma" includes those materials which bear a fragrance, for example, menthol and others. For simplicity, as used herein, the term "vapor barrier" can be interpreted to mean a barrier to gases and aromas as well as traditionally defined vapors.

Similarly as used herein, the term "solution" is interpreted to include colloidal dispersions and suspensions. By "colloidal dispersion or suspension" is meant any dispersion or suspension of particles in liquid, the particles being of a size greater than molecular scale that do not settle out. Generally the particle size in a suspension or dispersion of this invention are from about 10 to about 50,000 Angstroms. "Coating solution" as used herein is meant a liquid containing dissolved or suspended solids that do not settle out and which is used to apply said solids to a substrate.

B. Layered Inorganic Mineral Fillers

Useful layered fillers for the present invention include silicate materials such as phyllosilicates. Illustrative of such materials are smectite clay minerals such as bentonite, montmorillonite, nontronite, beidellite, volkonskoite, hectorite, saponite, sauconite, magadiite, and kenyaite, vermiculite, and the like. Other useful layered materials include illite minerals such as ledikite and admixtures of illites with the clay minerals named above.

Other useful layered inorganic materials are layered double hydroxides, such as $Mg_6Al_{3.4}(OH)_{18.8}(CO_3)_{1.7} H_2O$ (see W. T. Reichle, *J. Catal.,* 94:549 (1985), which have positively charged layers and exchangeable anions in the interlayer spaces. Other layered materials having little or no charge on the layers may be useful in this invention provided they can be intercalated with swelling agents which expand their interlayer spacing. Such materials include chlorides such as $ReCl_3$ and $FeOCl$, chalcogenides such as $TiS_2$, $MoS_2$, and $MOS_3$, cyanides such as $Ni(CN)_2$, and oxides such as $H_2Si_2O_5$, $V_6O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$—$2H_2O$, $CaPO_4CH_3$—$H_2O$, $MnHAsO_4$—$H_2O$, $Ag_6Mo_{10}O_{33}$, and the like. Preferred swellable layered materials are phyllosilicates of the 2:1 type having a negative charge on the layers ranging from about 0.25 to about 0.9 charges per formula unit and a commensurate number of exchangeable cations in the interlayer spaces. See, other layered materials described in International Patent Application No. PCT/US92/06733, published on Mar. 4, 1993 as WO93/04118.

A typical coating solution according to this invention may be prepared from commercially available layered silicates, preferably vermiculite. An exemplary commercially available aqueous dispersion of exfoliated vermiculite with a solids level of 7.5 percent by weight bears the trademark MicroLite® 963 Plus+ (W. R. Grace and Co.). Individual particles of this layered silicate are typically about 24–50 Angstroms thick and 10–22 microns in diameter, and thus possess very large aspect ratios, i.e., the quotient of the lateral dimension of a platelet filler particle divided by its thickness.

C. Inorganic Binders—Metal Polysilicates

Solid metal polysilicates have intrinsic permeability much lower than organic polymers, making them attractive binder materials for thin barrier coatings containing layered mineral particles. The metal polysilicate is generally selected from lithium polysilicate, sodium polysilicate, potassium polysilicate or copolysilicate blends of these materials. In the present coating solutions, where layered silicates are employed, flocculation of the silicate platelets must be avoided. This requirement places stringent restrictions on the formulation of a barrier coating solution containing layered silicates and metal polysilicates.

Layered silicates have isoelectric points (iep), i.e., the pH at which the zeta potential is zero, of about 2.5. Layered silicates form stable sols at the high pH, about pH 10, of metal polysilicate barrier coating solutions. This stability can be compromised by cations that accumulate in the Stern layer, reduce the zeta potential of the particles and thereby lower the coulombic repulsion barrier to flocculation. The effectiveness of cations in causing flocculation is expressed as the critical flocculation concentration. This is the concentration above which flocculation is rapid. Divalent and trivalent metals cause flocculation at very low concentrations; they must be avoided in the coating solutions of the present invention. For example, W. R. Grace product literature recommends that "all additives to MicroLite® dispersions be nonionic in nature." Additionally, the same product literature lists the critical flocculation concentration for sodium ions in the presence of MicroLite® dispersed vermiculites as 20 mmole/l. While prior art inventions that employ layered silicates in water soluble polymers or latexes adhere to this recommendation, the present invention does not. A typical coating solution of the present invention contains added lithium far in excess of the critical flocculation concentration. For example, a 7.5 weight percent solids coating solution, that when dried yields a coating comprising 20 weight percent lithium polysilicate ($SiO_2$:$Li_2O$=4.05) and 80 weight percent Microlite® dispersed vermiculite (see Example 2 below), contains 110 mmole/liter added lithium ion. While lithium ion is expected to be less destabilizing than sodium ion, the concentration of lithium ion in the above coating suspension is greater than what would be expected by one skilled in the art to result in a stable suspension.

Other factors, such as resistance of the metal polysilicate to efflorescence on exposure to atmospheric $CO_2$, favor the use of potassium polysilicate in a metal polysilicate coating solution. Potassium ion, however, would be expected by one skilled in the art to have a critical flocculation concentration similar to that of sodium.

Thus, where the layered silicate is vermiculite, which is susceptible to flocculation by cations, the preferred alkali metal polysilicate is lithium polysilicate. However, the formulation of a metal polysilicate coating solution containing dispersed vermiculite must be a compromise to balance solution stability and the other dried coating properties described above. One of skill in the art may adjust the relative ratios of the metal polysilicate to the layered silicate to achieve this-balance in properties of the coating solutions.

A typical coating solution according to this invention may be prepared from commercially available metal polysilicates, such as lithium polysilicate, sodium polysilicate and/or potassium polysilicate solutions. An exemplary commercially available product bearing the trademark Inobond® Li 2043 (van Baerle & Cie AG) is an aqueous colloidal suspension of lithium polysilicate which contains ~24.5 percent by weight silicon dioxide and ~3.0 percent by weight lithium oxide. Another useful metal polysilicate product bears the trademark K-4009 (van Baerle & Cie AG) and is an aqueous colloidal suspension containing ~26.8 percent by weight silicon dioxide and ~13 percent by weight potassium oxide.

D. Optional Surfactants

These coating compositions can also contain a suitable surfactant to reduce surface tension. Preferably, the surfactant is nonionic. The surfactant selected should possess a critical micelle concentration sufficiently low to ensure a dried coating whose gas, vapor and aroma barrier properties are not compromised. Most preferably, the surfactant is selected from the group consisting of acetylenic diols and alkyl ethoxylates. One exemplary commercially available acetylinic diol bears the trademark Genapol® 26-L-60N (Hoechst Celanese). Two exemplary commercially available alkyl ethoxylates bear the trademarks Genapol® UD050 (Hoechst Celanese) and Dynol® 604 (Air Products). The amount of surfactant added to the coating composition will depend on the particular surfactant selected, but should be the minimum amount of surfactant that is necessary to achieve the uncompromised dried coating. For example, typical surfactant amounts can be less than 0.1 percent by weight of an acetylenic diol or an alkyl ethoxylate.

E. Method of the Invention

The layered silicate-metal polysilicate coatings of the invention can be used on a variety of polymeric articles, polymeric films, polymeric sheets, rigid and semi-rigid polymeric containers and other surfaces to improve (i.e., reduce) the gas permeability of the products. These coatings are particularly advantageous where the polymers used to prepare these articles do not provide sufficient vapor, gas or aroma impermeability for the desired application. Such polymers include polyesters, such as poly(ethylene terephthalate) (PET); polyolefins, particularly polypropylene, polyethylene and cycloolefins (COC), such as a copolymer of ethylene and norbornene [U.S. Pat. No. 5,087,677]; and polyamides, such as nylon. Typically, polypropylene and PET films are biaxially oriented, depending on the customer requirements. Especially preferred articles for coating with compositions of the present invention include polymeric films, bottles, jars, blisterpacks, and sheets commonly used in the food industry, containers and lidstocks, made of the foregoing polymers.

A typical coating solution according to this invention may be prepared from the above-described commercially available products. For instance, MicroLite® 963 Plus+ vermiculite, and either Inobond® Li 2043 lithium polysilicate or K-4009® potassium silicate suspension, or both polysilicates, are mixed with water to produce a colloidal suspension having a desired solids content. One can also prepare the coating solutions of the invention by using the "parent" products which are used to produce the commercially available polysilicates, but such preparation is well-known and unnecessary in view of the commercial availability of the lithium and potassium polysilicate solutions.

A typical useful solids content in the coating solution ranges from about 2 percent to about 10 percent by weight of solids. The desired solids content of the solution depends on the coating method used, as well as the specific coating formulation, and may be adjusted to achieve a thickness of between about 100 to about 500 nm of the dry coating. Preferably, where the components of the coating solution are vermiculite and lithium polysilicate, the solids content is between about 2 and about 8 percent by weight. Such an adjustment is well within the skill of the art [see, e.g., Canadian Patent No. 993,738].

After a period of stirring, a surfactant may be optionally added to reduce surface tension of the coating mixture. The barrier coating mixture is then ready to be applied to a polymeric surface. Conventional coating techniques, such as roll coating, spray coating, brush coating and dip coating, may be used. These techniques include, but are not limited to, roll, rod, reverse roll, forward roll, air knife, knife over roll, blade, gravure and slot die coating methods. General descriptions of these types of coating methods may be found in texts, such as *Modern Coating and Drying Techniques*, (E. Cohen and E. Gutoff, eds; VCH Publishers) New York (1992) and *Web Processing and Converting Technology and Equipment*, (D. Satas, ed; Van Nostrand Reinhold) New York (1984). Three dimensional articles may preferably be coated by spray coating or dip coating methods, among others. The method of application is not a limitation on the present invention, but may be selected from among these and other well-known methods by the person of skill in the art.

The polymeric articles to be coated by the compositions of the invention may be previously untreated. Optionally, the polymeric article, such as a film or bottle, may be first plasma treated to improve wetting and adhesion by the barrier coating as described in the following Example 1. Alternatively, the polymeric article may be corona-treated by the industry-wide corona discharge treatment method. In instances where corona-treatment of the polymer does not cause suitable wetting of the coating on the polymer, a suitable primer may be first applied to the polymeric article. For example, in the case of polypropylene, a primer solution of poly(vinyl alcohol) or poly(hydroxystyrene) may be used to improve wetting of the polymer. The polymeric article or surface may also be flame treated or chemically etched or oxidized prior to the application of a primer solution or, alternatively, prior to the application of the coating solution of this invention.

Alternatively, the article may bear on at least one surface or side, a heat seal layer. Examples of such heat seal layers are an ethylene-propylene copolymer or ethylene-propylene-butylene terpolymer.

Exemplary polyolefin substrates used in the examples below are the FND xx and SCM xx grade biaxially-oriented polypropylene (BOPP) films produced by Trespaphan GmbH. The number, xx, refers to the film thickness in micrometers; thus FND 30 is a 30 µm (or 1.2 mil) thick BOPP film. These films are designed to be metallized by thermal or electron-beam evaporation of aluminum. FND and SCM grade BOPP films are three-layer laminates with thin heat-sealable layers on both sides. One side of the film is corona treated at the factory to a surface energy of 36–39 dynes/cm to improve adhesion of aluminum. Supplemental corona treatment, immediately before applying a primer solution, was found to be beneficial even for these films that were corona treated at the factory. Similar commercially available polypropylene films that will be suitable in the present invention include AQS, MT BASE, and MVT BASE films (AET Packaging Films). These all have a heat seal layer on one side only and, in the case of AQS, a high energy treated surface for waterborne coatings. These are all intended to be coated on the side opposite from the heat seal layer.

Alternatively, the polymeric substrate may have a protective topcoat or laminate layer, such as polyurethane or Teflon®-type materials [DuPont]. Such topcoats or laminates may be selected by one of skill in the art, depending on the substrate and its intended use. The coating mixture of this invention may be applied over or under such additional layers.

After coating the article, the resultant product must be dried at a selected temperature at or above room temperature. The selection of the drying temperature depends on the desired time for drying. Accelerated drying times may be achieved at elevated temperatures which would not be necessary if a longer time period for drying was acceptable. However, one of skill in the art can readily adjust the oven temperature and exposure time as desired. The performance of the dried barrier coating is insensitive to the drying temperature throughout the temperature range between about 25 to about 200° C.

The coating solutions according to this invention yield a dried coating that is substantially transparent at a thickness of less than 500 nm, the clarity improving with increased metal polysilicate fraction. These solutions provide a high vapor barrier capability, when dried, and are characterized by enhanced flex resistance on the coated article.

The following examples illustrate the preferred coating solutions and methods of the invention. These examples are illustrative only and do not limit the scope of the invention.

EXAMPLE 1

PREPARATION AND COATING OF LITHIUM-POTASSIUM COPOLYSILICATE BARRIER COATINGS CONTAINING DISPERSED VERMICULITE ON BIAXIALLY ORIENTED POLYPROPYLENE FILM

A. Solution Preparation

A one weight percent dispersion of Dynol® 604 surfactant (Air Products) was prepared by dispersing 10.0 g Dynol® 604 surfactant in sufficient distilled water to make 1000.0 ml of solution. This suspension was stirred vigorously immediately before use.

Solution A, a lithium-potassium copolysilicate solution having values of x and y of 0.5 and 3.64, respectively, for the formula $(Li_2O)_x(K_2O)_{1-x}(SiO_2)_y$, and containing 20 percent by weight solids, was prepared by stirring together 19.43 g distilled water, 12.90 g K-4009 solution, and 17.7 g Inobond® Li 2043 solution for ~30 minutes.

A series of lithium-potassium copolysilicate solutions containing dispersed vermiculite were prepared according to the amounts listed in Table I. Aqueous dispersions of Micro-Lite® dispersed vermiculite were prepared by diluting with distilled water the, as received, MicroLite® 963Plus+ suspension containing 7.5 percent solids. These suspensions were then added to the appropriate amount of copolysilicate solution A. The surfactant solution was then added to the stirring mixture of vermiculite and copolysilicate. Solutions were not filtered before coating. All solutions had an overall solids level calculated to be 7.9 percent by weight. Sample solution C gelled immediately upon addition of the metal silicate solution and was not used further (see Table I).

B. Film Preparation and Coating

Four inch circles were cut from biaxially oriented Trespaphan® FND 20 polypropylene film (BOPP) (0.8 mil thick) with a scalpel. Any dust on the film was blown off with a jet of clean, filtered air. The film circles were then corona treated to improve wetting by polysilicate coating solutions and adhesion of dried polysilicate coatings. Corona treatment was performed using a Tantec Lab System II corona treater using a ceramic electrode with a 2 mm gap. The power setting was 90 percent, and the electrode was scanned over the film surface by hand for 20 s (approximately 10 passes). Approximately 10 g of the copolysilicate-vermiculite coating solution was dispensed on the polypropylene film. A spreading spin cycle of 300 rpm for 1 s was followed immediately by a spin cycle of 2000 rpm for 10 seconds. The coated films were dried in an oven maintained at 50° C. for ~120 s. Several coated film samples were prepared with each coating solution.

C. Oxygen Barrier Measurement

Oxygen transmission rate (OTR) measurements were made using a Mocon instrument at 30° C. and zero percent relative humidity. Table I presents the OTR values for films prepared as described in the Example. As a point of reference, an uncoated sample of FND 20 film tested under the same conditions exhibited an OTR of 2862 $cm^3/[m^2$ day atm].

EXAMPLE 2

PREPARATION AND COATING OF LITHIUM POLYSILICATE BARRIER COATINGS CONTAINING DISPERSED VERMICULITE ON BIAXIALLY ORIENTED POLYPROPYLENE FILM

A. Primer Preparation

Finely ground polymer grade poly(para-hydroxystyrene) (Hoechst Celanese), 1.00 g, was added to 99.0 g of a 0.1 N aqueous solution of lithium hydroxide solution and heated at 50° C. until the solids were dissolved. The resulting brown-orange solution was filtered through fluted filter paper before use. A change in color of the solution from orange-brown to green-brown on standing overnight did not affect the performance of the solution as a primer.

B. Coating Solution Preparation

A series of colloidal solutions of lithium polysilicate barrier coating solutions containing dispersed vermiculite dispersion were prepared using the reagents and quantities listed in Table II by first diluting the MicroLite® 963 Plus+ dispersion with distilled water and then adding Inobond® Li 2043 lithium polysilicate solution with stirring. Each suspension was stirred for 30 minutes immediately before coating and was not filtered. Each suspension had a total solids level of 7.5 percent by weight.

C. Film Preparation and Coating

Four inch circles were cut from Trespaphan® FND 20 BOPP film (0.8 mil thick) with a scalpel. Any dust on the film was blown off with a jet of clean, filtered air. The film circles were then corona treated as described in Example 1. Approximately 10 g of the poly(para-hydroxystyrene) primer solution was dispensed on the polypropylene film. A spreading spin cycle of 300 rpm for 1 s was followed immediately by a spin cycle of 2000 rpm for 10 s. The coated films were dried in an oven maintained at 50° C. for ~120 seconds.

After the priming process, approximately 10 g of a polysilicate-vermiculite dispersion was dispensed onto the primed side of the polypropylene film. A spreading spin cycle of 300 rpm for 1 s was followed immediately by a spin cycle of 2000 rpm for 10 s. The coated films were dried in an oven maintained at 50° C. for ~30 seconds.

D. Oxygen Barrier Measurements

Oxygen transmission rate measurements were made using a Mocon instrument at 30° C. under dry conditions. Table II presents the OTR values for films prepared as described in the Example. As a point of reference, a sample typical sample of uncoated FND 20 film tested under the same conditions exhibited an OTR of 2862 $cm^3/[m^2$ day atm].

TABLE I

Lithium-Potassium Copolysilicate-Dispersed Vermiculite Barrier Coatings on 0.8 mil Thick BOPP Film

| Solution | Mass of Lithium-potassium copolysilicate solution A (g) | Mass of MicroLite ® 963 Plus + Dispersion (g) | Mass of Distilled Water (g) | Mass of 1% Dynol ® 604 Solution (g) | Percent vermiculite in dry coating | $O_2$ Transmission Rate ($cm^3/[m^2$ day atm] at 30° C./0% RH) |
|---|---|---|---|---|---|---|
| B | 22.50 | 6.67 | 33.33 | 0.62 | 10 | 456 |
| C | 12.50 | 33.33 | 16.70 | 0.62 | 50 | Solution gelled |
| D | 2.50 | 60.00 | 0.00 | 0.62 | 90 | 2903 |

TABLE II

Lithium Polysilicate-Dispersed Vermiculite Barrier coatings on 0.8 mil Thick BOPP Film

| Sample | Percent vermiculite in dry coating | Mass of MicroLite ® 960 Plus + Dispersion (g) | Mass of Inobond ® Li 2043 (g) | Mass of Distilled Water (g) | $O_2$ Transmission Rate ($cm^3/[m^2$ dry atm]; 30° C. 0% RH) |
|---|---|---|---|---|---|
| A | 0 | 0 | 13.64 | 36.36 | 1161 |
| B | 10 | 5.07 | 12.25 | 32.68 | 1563 |
| C | 20 | 10.00 | 10.91 | 29.09 | 1662 |
| D | 40 | 20.00 | 8.18 | 21.82 | 1204 |
| E | 60 | 30.00 | 5.45 | 14.55 | 181 |
| F | 80 | 40.00 | 2.73 | 7.27 | 3 |
| G | 90 | 44.93 | 1.38 | 3.69 | 2 |
| H | 100 | 50.00 | 0 | 0 | 36 |

EXAMPLE 3

OXYGEN TRANSMISSION RATE VS. RELATIVE HUMIDITY OF BOPP FILM COATED WITH A LITHIUM POLYSILICATE-DISPERSED VERMICULITE BARRIER COATING

A sample of 0.8 mil thick BOPP film was primed and coated according to the method of Example 2 with the dispersed vermiculite-lithium polysilicate solution described in Example 2G (see Table II).

Oxygen transmission rate measurements were made using a Mocon instrument at 23° C. A sample was tested consecutively at 0, 40, 60, 70, 80, 90 and again at 0 percent relative humidities. The film was not removed from the sample chamber between measurements. Table III presents the measured oxygen transmission rates for a typical sample tested in this manner.

TABLE III

Oxygen Transmission Rates vs. Relative Humidity for 0.8 mil Thick BOPP Film Coated with Lithium Polysilicate Coating Containing 90 Percent by Weight Dispersed Vermiculite

| Percent Relative Humidity | Oxygen Transmission Rate ($cm^3/[m^2$ day atm] at 23° C.) |
|---|---|
| 0 - INITIAL | 1 |
| 40 | 1 |
| 60 | 1 |
| 70 | 1 |
| 80 | 2 |
| 90 | 4 |
| 0 - FINAL | 1 |

COMPARATIVE EXAMPLE 4

OXYGEN TRANSMISSION RATE VS. RELATIVE HUMIDITY OF BOPP FILM COATED WITH A LITHIUM-POTASSIUM POLYSILICATE BARRIER COATING

A sample of 0.8 mil BOPP film was primed and coated according to the method of Example 2 with a lithium-potassium copolysilicate solution containing 10 percent solids by weight of the copolysilicate $(Li_2O)_x(K_2O)_{1-x}(SiO_2)_y$ wherein x, the mole fraction of $Li_2O$ in the combined metal oxides, $M_2O$, is 0.5 and the y, the molar ratio of $SiO_2$:$M_2O$, is 3.64.

Oxygen transmission rate measurements were made using a Mocon instrument at 23° C. One sample, labeled A in this Example was tested at 0 percent relative humidity. A second sample, labeled B, was tested consecutively at 40, 60, 70, 80, 90, 0 percent relative humidities. This film was not removed from the sample chamber between measurements. Table IV presents the measured oxygen transmission rates for a typical sample tested in this manner.

TABLE IV

Oxygen Transmission Rates vs. Relative Humidity for 0.8 mil Thick BOP Film Coated with Lithium-Potassium Copolysilicate Coating

| Sample | Percent Relative Humidity | Oxygen Transmission Rate ($cm^3/[m^2$ day atm] at 23° C.) |
|---|---|---|
| A | 0 | 287 |
| B | 40 | 402 |
| B | 60 | 311 |
| B | 70 | 136 |
| B | 80 | 153 |
| B | 90 | 1022 |
| B | 0 | 1147 |

EXAMPLE 5

VERMICULITE-CONTAINING PRIMERS FOR METAL POLYSILICATE BARRIER COATINGS.

Another embodiment of the methods of this invention employs laying down an extremely thin (10–50 nm) primer layer of a diluted coating of the present invention, i.e., about 1.0–2.5 percent by weight of the coatings of Example 1 containing both dispersed vermiculite and metal polysilicate. Upon the top of this layer is deposited an additional coating of a thicker layer of metal polysilicate from a more concentrated suspension not containing dispersed vermiculite. Such a composite barrier layer offers the advantages of improved barrier performance without the side effect of a slightly yellow color.

A. Coating Solution Preparation

A 2.5 weight percent aqueous dispersion of lithium polysilicate and dispersed vermiculite was prepared by diluting 10 g of the dispersion labeled G in Table II with 20 g of distilled water. The resulting dispersion was one in which 10 percent of the dry coating weight was lithium polysilicate and 90 percent of the dry coating weight was vermiculite.

A 10 percent solids solution was prepared of the copolysilicate $(Li_2O)_x(K_2O)_{1-x}(SiO_2)_y$, wherein x, the mole fraction of $Li_2O$ of combined metal oxides $M_2O$, was 0.5 and y, the molar ratio of $SiO_2:M_2O$, was 3.64. With continuous stirring 53.1 g of Inobond® Li 2043 dispersion was diluted with 108.1 g of distilled water, followed by addition 38.8 g of K-4009 dispersion. The dispersion was stirred overnight and then filtered through Celite 545® diatomaceous earth. To the solution was added 2.0 g of the Dynol® 604 surfactant solution described in Example 1.

B. Film Preparation and Coating

Four inch circles were cut from Trespaphan® FND 15 BOPP film (0.6 mil thick) with a scalpel. Any dust on the film was blown off with a jet of clean, filtered air. Approximately 10 g of primer solution described in Example 2A was dispensed on the polypropylene film. A spreading spin cycle of 300 rpm for 1 second was followed immediately by a spin cycle of 2000 rpm for 10 s. The coated films were dried in an oven maintained at 50° C. for ~30 s.

After the priming process, approximately 10 g of the polysilicate-vermiculite dispersion was dispensed on the primed side of the polypropylene film. A spreading spin cycle of 300 rpm for 1 s was followed immediately by a spin cycle of 2000 rpm for 10s. The coated films were dried in an oven maintained at 50° C. for ~30 s. This coating process was repeated using the copolysilicate solution described above.

C. Oxygen Barrier Measurements

Oxygen transmission rate measurements were made using a Mocon instrument. An OTR of 66 $cm^3/[m^2$ day atm] was measured at 23° C. and at 0 percent relative humidity for a film prepared in the manner above. For comparison, a sample of uncoated FND 15 film exhibits an OTR of 2250 $cm^3/[m^2$ day atm] under the same conditions.

EXAMPLE 6

ROLL COATING OF LITHIUM POLYSILICATE-DISPERSED VERMICULITE COATINGS ONTO BIAXIALLY ORIENTED POLYPROPYLENE FILM

A. Primer Preparation

A poly(vinyl alcohol) primer solution was prepared. Poly (vinyl alcohol) (Aldrich, 98–99% hydrolyzed, average $M_w$, 85,000–146,000; 30.0 g) was added to 3000 g distilled water. The mixture was heated to 80° C. and stirred until dissolution of polymer appeared complete. A water clear solution was obtained by filtering the hot solution through fluted filter paper. To the cooled solution was added 0.3 g Dynol® 604 nonionic surfactant.

A one weight percent solution of poly(para-hydroxystyrene) in 0.1 N aqueous lithium hydroxide, PHS, was prepared by adding 30.0 g of finely ground polymer grade poly(para-hydroxystyrene) (Hoechst Celanese) to 3000 g of 0.1 N aqueous lithium hydroxide and heated at 50° C. until the solids are dissolved. The resulting brown-orange solution was filtered through fluted filter paper before use. After cooling, 0.3 g of Dynol® 604 nonionic surfactant was added to the solution with stirring. A change in color of the solution from orange-brown to green-brown on standing overnight did not affect the performance of the solution as a primer.

B. Solution Preparation and Coating

Solutions of lithium polysilicate-dispersed vermiculite were prepared using the amounts shown in Table V and using the procedure described in Example 3. Trespaphan® FND 20, biaxially oriented polypropylene film (0.8 mil thick) was run through a multiple stage reverse gravure roll coater such that a primer layer of poly(para-hydroxystyrene) or PVOH was applied and dried, followed by application and drying of a lithium polysilicate-dispersed vermiculite coating solution of this example.

C. Oxygen Barrier Measurement

Oxygen transmission rate measurements were made using a Mocon instrument at 30° C. under dry conditions. Table V presents OTR results for films described in the Example.

TABLE V

Lithium Polysilicate Containing Dispersed Vermiculite Barrier Coatings Applied by Reverse Gravure Roll Coating to 0.8 mil Thick BOPP Film

| Experiment | Primer Used | Percent by weight vermiculite in dried coating | Total Solution Percent solids | MicroLite ® 963 Plus + Dispersion (g) | Mass Inobond ® Li 2043 (g) | Mass Distilled Water (g) | $O_2$ Transmission Rate ($cm^3/[m^2$ day atm]; 30° C. 0% RH) |
|---|---|---|---|---|---|---|---|
| A | PHS | 80 | 7.5 | 2400 | 164 | 436 | 263 |
| B | PVOH | 80 | 2.5 | 800 | 54.5 | 2145 | 395 |
| C | PVOH | 60 | 2.5 | 600 | 109 | 2291 | 210 |
| D | PVOH | 60 | 5.0 | 1200 | 218 | 1582 | 168 |
| E | PVOH | 60 | 7.5 | 1800 | 327 | 872 | 122 |

EXAMPLE 7

ROLL COATING-OF LITHIUM POLYSILICATE-DISPERSED VERMICULITE COATINGS ONTO POLY(ETHYLENE TEREPHTHALATE) FILM

A. Solution Preparation and Coating

Solutions of lithium polysilicate-dispersed vermiculite were prepared using the amounts shown in Table VI and using the procedure described in Example 3. Hostaphan® 2400, biaxially oriented poly(ethylene terephthalate) (0.5 mil thick) film was run through a multiple stage reverse gravure roll coater such that a primer layer of poly(para-hydroxystyrene), PHS, or PVOH was applied and dried, and followed by application and drying of a lithium polysilicate/dispersed vermiculite coating solution. Both coating and drying were accomplished using a reverse gravure roll coating process.

B. Oxygen Barrier Measurement

Oxygen transmission rate measurements were made using a Mocon instrument at 30° C. under dry conditions. Table VI presents the measured oxygen transmission rates for film samples prepared in this manner. As a point of reference, uncoated PET film used in this example exhibits a typical OTR of 170 $cm^3/[m^2$ day atm] when tested under the same conditions.

TABLE VI

Lithium Polysilicate Containing Dispersed Vermiculite Barrier Coatings
Applied by Reverse Gravure Roll Coating to 0.5 mil Thick PET Film

| Experiment | Primer Used | Percent by weight vermiculite in dried coating | Total Solution Percent solids | Mass of MicroLite ® 963 Plus + Dispersion (g) | Mass of Inobond ® Li 2043 (g) | Mass of Distilled Water (g) | $O_2$ Transmission Rate ($cm^3/[m^2$ day atm]; 30° C. 0% RH) |
|---|---|---|---|---|---|---|---|
| A | PHS | 80 | 7.5 | 2400 | 164 | 436 | 18 |
| B | PVOH | 60 | 7.5 | 1800 | 327 | 872 | 1 |

EXAMPLE 8

FLEX TESTING-PET FILM COATED WITH A LITHIUM POLYSILICATE BARRIER COATING CONTAINING DISPERSED VERMICULITE

A sample of the biaxially oriented PET film primed with PVOH and barrier coated with a lithium polysilicate-vermiculite blend as described in Example 7 was subjected to 50 flex cycles in a standard Gelbo flex testing machine. Oxygen transmission rate measurements were made using Mocon instrument at 30° C. under dry conditions. The OTR of the flexed film was measured to be 670 $cm^3/[m^2$ day atm] at 30° C. and 0 percent relative humidity. This is approximately a five-fold increase in OTR from the measured OTR for an unflexed sample of this film.

COMPARATIVE EXAMPLE 9

FLEX TESTING PET FILM COATED WITH A LITHIUM-POTASSIUM COPOLYSILICATE BARRIER COATING

A. Solution Preparation and Coating

A lithium-potassium copolysilicate coating solution prepared as described in Example 4 was diluted with an equivalent mass of distilled water. The resulting solution contained 5 percent by weight solids of the copolysilicate $(Li_2O)_x(K_2O)_{1-x}(SiO_2)_y$, wherein x, the mole fraction of $Li_2O$ of combined metal oxides $M_2O$, was 0.5 and y, the molar ratio of $SiO_2:M_2O$, was 3.64.

Hostaphan® 2400, biaxially oriented poly(ethylene terephthalate) (0.5 mil thick) film was run through a multiple stage reverse gravure roll coater such that a primer layer of PVOH (Example 6A) was applied and dried, and followed by application and drying of the copolysilicate coating solution described in this example. Both coating steps were accomplished-using a reverse gravure roll coating process.

B. Flex Testing and OTR Measurements

A sample of the biaxially oriented PET film primed with PVOH and barrier coated with the copolysilicate described above was subjected to 50 flex cycles in a standard Gelbo flex testing machine. Oxygen transmission rate measurements were made using instrument at 30° C. under dry conditions. The OTR of the flexed film was measured to be 1231 $cm^3/[m^2$ day atm] at 30° C. and 0 percent relative humidity. This is approximately a nine-fold increase in OTR from the measured OTR for an unflexed sample of this film.

EXAMPLE 10

AIR KNIFE COATING OF LITHIUM POLYSILICATE-DISPERSED VERMICULITE COATINGS ONTO BIAXIALLY ORIENTED POLYPROPYLENE FILM

Hostaphan® 2400, biaxially oriented poly(ethylene terephthalate) film (Hoechst Diafoil, 0.5 mil thick) was coated with an aqueous primer solution containing 1 percent poly(para-hydroxystyrene), 0.01 percent Dynol® 604 surfactant, and 0.02 percent Genapol® UD050 surfactant by weight in 0.1 N lithium hydroxide and subsequently dried. The resulting primed film was then coated with the solution labeled E in Table V by an air knife process and subsequently dried. Oxygen transmission rate measurements performed on a Mocon instrument at 23°C. and 0 percent relative humidity resulted in an average OTR value of 2.7±1.8 $cm^3/[m^2$ day atm] for 8 samples.

All references and patents cited above are incorporated herein by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A vapor barrier coating solution for polymeric articles consisting of:
   a) a metal polysilicate solution,
   b) an inorganic layered silicate, and
   c) a surfactant.

2. The solution according to claim 1 wherein said layered silicate is selected from the group consisting of bentonite, vermiculite, montmorillonite, nontronite, beidellite, volkonskoite, hectorite, saponite, sauconite, magadiite, kenyaite, ledikite and admixtures thereof.

3. The solution according to claim 1 wherein said metal polysilicate is a copolysilicate of lithium and potassium of the formula $(Li_2O)_x(K_2O)_{1-x}(SiO_2)_y$, wherein x is between 0 and 1 and y is between 1 and 10.

4. The solution according to claim 1 wherein said metal polysilicate is a copolysilicate-of lithium and potassium of the formula $(Li_2O)_x(K_2O)_{1-x}(SiO_2)_y$, wherein x is between 0.5 and 1 and y is between 1 and 10.

5. The solution according to claim 1 wherein said metal polysilicate is lithium polysilicate.

6. The coating solution according to claim 1 wherein said layered silicate is substantially exfoliated vermiculite.

7. The coating-solution according to claim 1, which yields a dried coating that is substantially transparent at a thickness of less than 500 nm.

8. The coating solution according to claim 1 wherein said layered silicate comprises up to 99 percent by weight of the inorganic solids in said solution.

9. The coating solution according to claim 1 wherein said layered silicate comprises between 40 and 90 percent by weight of the inorganic solids in said solution.

10. The coating solution according to claim 1, wherein the surfactant is nonionic and possesses a critical micelle concentration sufficiently low to ensure a dried coating uncompromised by residual surfactant.

11. The coating solution according to claim 10, wherein the surfactant is selected from the group consisting of acetylenic diols and alkyl ethoxylates.

12. The vapor barrier coating solution according to claim 1, having a solids content of between 2 to 10% by weight.

13. The vapor barrier coating solution according to claim 1, wherein said surfactant is present in an amount of less than 0.1% by weight.

* * * * *

UNITED STATES PATENT AND TRADEMARK OFFICE
CERTIFICATE OF CORRECTION

PATENT NO. : 6,013,128
DATED : January 11, 2000
INVENTOR(S) : Michael A. Hubbard, James A. McCaulley, and Steven F. Nielsen It is certified that error appears in the above-indentified patent and that said Letters Patent is hereby corrected as shown below:

On the title page, at the end of the abstract after "99", insert -- percent. Preferably the layered silicate is vermiculite and the polysilicate is lithium polysilicate. --.

Col. 2, line 34, replace "d)" with -- (d) --.

Col. 9, in Table II, in the third column heading, replace "960" with -- 963 --.

Col. 14, line 48, in Claim 4, delete the hyphen "-" after "copolysilicate".

Col. 14, line 55, in Claim 7, delete the hyphen "-" after "coating".

Signed and Sealed this

Twentieth Day of February, 2001

Attest:

NICHOLAS P. GODICI

Attesting Officer

Acting Director of the United States Patent and Trademark Office